TRANSPARENT EUTECTICS WITH LAMELLAR MICROSTRUCTURES
AND METHOD OF MAKING SAME
Filed Oct. 19, 1966

INVENTORS J. D. HUNT
K. A. JACKSON
BY George S. Indig
ATTORNEY

United States Patent Office 3,484,153

Patented Dec. 16, 1969

3,484,153

TRANSPARENT EUTECTICS WITH LAMELLAR MICROSTRUCTURES AND METHOD OF MAKING SAME

John D. Hunt, Blewbury, England, and Kenneth A. Jackson, New Providence, N.J., assignors to Bell Telephone Laboratories, Incorporated, Murray Hill and Berkeley Heights, N.J., a corporation of New Jersey Filed Oct. 19, 1966, Ser. No. 587,891
Int. Cl. G02b 5/18, 5/30, 27/28
U.S. Cl. 350—162 8 Claims

ABSTRACT OF THE DISCLOSURE

Transparent organic solids having highly regular lamellar microstructures are produced by the controlled freezing of organic eutectic and near-eutectic liquids, and are useful, for example, as diffraction gratings and polarizers.

This invention relates to transparent organic solids which have lamellar microstructures which exhibit highly regular spacings and to the method by which such highly regular lamellates are produced. More particularly, these organic lamellates are organic eutectics and near-eutectics which, because of their transparency and highly regular lamellar microstructure, are useful in optical devices and systems.

Figure 1:
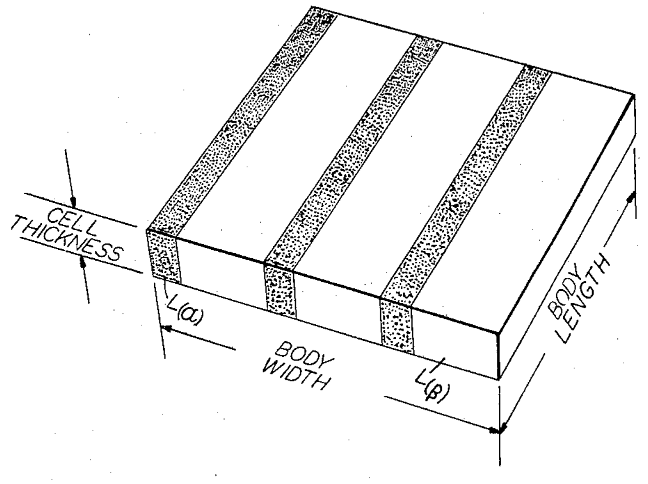
Figure 2:
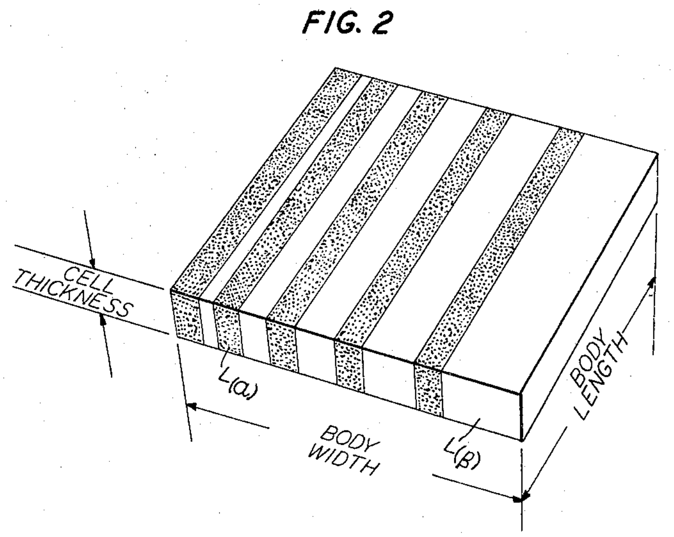

For a better understanding of this invention, the accompanying drawing is presented in which:

FIG. 1 is a perspective view of a microstructure which exhibits alternate lamellae of uniform width as produced in accordance with this invention; and FIG. 2 is a perspective view of a microstructure which exhibits alternate lamellae, wherein there is a gradation of lamellae widths as produced in accordance with this invention.

It is known that certain metal eutectic compositions freeze into solids with lamellar-type microstructures. However, there has been no disclosure of any organic system which produces similar lamellates.

This invention is grounded on the discovery that certain binary organic systems can be solidified in a manner which results in their having microstructures which consist essentially of alternate lamellae.

One aspect of this invention is the discovery that the organic systems of carbon tetrabromide-hexachloroethane, camphor-succinonitrile and carbon tetrabromide-succinonitrile will freeze with lamellar microstructures at or near their eutectic compositions.

A second aspect of this invention is the method by which these organic systems are solidified to exhibit very highly lamellar, defect-free microstructures. This technique includes thin film freezing of pure components, at slow rates, under the influence of a temperature gradient.

The freezing of the organic eutectics and near-eutectics of this invention is conducted in the presence of a temperature gradient in which thin films of the solid bodies are formed. Thin films are obtained by freezing the liquid organic components of the desired system in very thin cells, about 1 to 10 mils in thickness. The cells are formed by sealing three sides of two flat members by fusion, leaving a 1 to 10 mil gap. The volume between the members may be filled by the action of surface tension. Once filled, the fourth unsealed side is temporarily sealed to limit evaporation effects.

The temperature gradient may be conveniently established across an air gap formed between two metal blocks one of which is at a temperature above, and the other of which is at a temperature at or below, that of the melting point of the body to be formed.

Once the cell is filled with the organic it is then driven by a small motor through the gradient in the direction of descending temperature. As the entire cell passes over to the low temperature side, the entire eutectic or near-eutectic solid forms in the cell as a thin film.

A full description of the apparatus used in accordance with the thin film freezing of the organic eutectics of this invention can be found in The Review of Scientific Instruments, vol. 37, No. 6, June 1966.

The use of a thin film technique in conjunction with careful control of parameters discussed below (i.e., growth rate, impurity level, temperature gradient) results in a microstructure consisting of alternate lamellae of each component which are of uniform width (or of a continuous gradation in width, if desired) and which are substantially free of discontinuities along their individual lengths.

Excellent regular lamellates with microstructures like those just described may be obtained at cell thicknesses up to 10 mils with a preferred range of from 1 to 3 mils. While lamellates can be grown over still greater thicknesses the wider the cell gap the closer freezing comes to be a bulk process and the less regular and defect-free is the resulting structure. In general, to avoid a bulk-type freezing process the ratio of cell gap to lamella spacing should not exceed 10:1.

The end temperatures within the temperature gradient may be set by any convenient technique. The particular temperature required for freezing is dependent on the particular organic system used. The thin film technique of this invention, when applied to the organic systems of this invention, yields highly regular lamellates when the temperature gradient is of the range of 100 to 800° C./cm.

Highly regular lamellates are produced in accordance with the thin film technique of this invention at growth rates from 0.002 to 2 mm. per minute, using reagent grade chemicals (about 1 part total impurity in 10,000). Higher growth rates may be attained at lower impurity levels without any transition from lamellar to cellular and other irregular microstructures. Even with total impurity level of about 1 part in 1000, a highly regular lamellar structure is obtained provided a "slow" growth rate from 0.02 to 0.1 mm./min. is maintained. For this reason it is preferred that total impurity content not exceed 0.1% by weight in the initial constituents used.

The absence of irregular structure is enhanced by growing the thin film over greater distances. Since the cell length determines the film length it is necessary either to have a long cell or to reverse the cell after freezing for successive passes through the temperature gradient. This is accomplished by remelting the film almost entirely, leaving unmelted only that end which was last solidified on the first pass. This unmelted end then serves as the base on which the remelted portion is resolidified. The process is repeated. Therefore, solidification on each successive pass always begins on the cell end which last solidified on the previous pass, thus effectively lengthening the path length over which the end-product lamellate is grown.

The organic lamellates of this invention freeze with microstructures represented by that of FIG. 1. FIG. 1 depicts a microstructure of an organic solid body of components A and B, which consists essentially of alternate lamellae of definite composition, lamella $L(\alpha)$ of composition $\alpha$ and lamella $L(\beta)$ of composition $\beta$. The widths of the lamellae of $\alpha$ phase are substantially the same, and the widths of the lamellae of $\beta$ phase are substantially the same, although the width of a lamella of the $\alpha$ phase is not necessarily the same as the width of a lamella of $\beta$ phase (although it may be the same).

The lamellae of the α and β phases are also free of discontinuities in the direction of their lengths.

It is to be understood that the compositions of the lamellae are not limited to pure A and B. The compositions represented by α and β may be pure A and B or solutions of A and B depnding upon the phase diagram of the particular binary system used.

The lamellates of FIG. 1 are formed from eutectic compositions of the organic systems disclosed earlier. However, if the organic compositions from which the solid is to be grown are at near-eutectic compositions, that is, within 5 weight percent from the amount of each component required for the eutectic composition, the lamellar structure of FIG. 1 is still produced.

Indeed, even when the thin cell is filled partially with one of the pure constituents of the binary organic system, with the remaining volume then taken up by the second pure constitutent, a lamellar solid is produced. In this case, a lamellate solid is observed only where there is a region of mixing. The lamellate so produced is still free of discontinuities along the lengths of the lamellae, but there is a variation in the width of alternate lamellae of at least one component. FIG. 2 represents such a structure in which alternate lamellae of β phase exhibit a gradation in their widths, while the lamellae of α phase are uniform in width throughout. FIG. 2 is representative only of the microstructure formed in the region of mixing.

When carbon tetrabromide and hexachlorethane are the pure constituents used in the manner of FIG. 2, a near-eutectic solid appears. This solid is lamellar and is sandwiched between the solid phases representing the purer constituents which are away from the region of mixing. The lamellae so produced exhibit a variation in widths such that near the carbon tetrabromide-rich phase the lamellae of carbon tetrabromide are wider than those near the carbon tetrabromide lean phase, with a continuum of carbon tetrabromide lamellae width between.

However, as noted earlier, when the cell is completely filled with a eutectic or near-eutectic composition, the solid lamellate produced on freezing is of uniformly wide alternate lamellae provided the conditions are not varied during growth.

The organic lamellates of this invention are useful in the scientific investigations of freezing, and as optical materials owing to their transparency. These lamellates are transparent to energy in the visible range of the spectrum, but their use is not limited to the visible region and in general may extend throughout the range of wavelengths of energy from 0.001–0.00001 cm. These lamellates with their highly regularly spaced lamellae are suitable for use in diffraction gratings and polarizers in a manner understood by those skilled in the art of such devices.

EXAMPLE 1

The eutectic of the carbon tetrabromidehexachloroethane system was frozen at about 90° C., 91.4 weight percent carbon tetrabromide and 8.6 weight percent hexachloroethane. The lamellar spacing was attained by unidirectionally freezing in a temperature gradient of 150° C./cm. at a rate of about 0.2 mm. per minute. Growth rate was kept at this level to ensure a highly regular microstructure. The eutectic solid was grown in one direction, then the direction of growth was reversed, and then reversed again, to further improve regularity.

The resulting eutectic solid was highly lamellar with spacing between lamellae of approximately 16.5 microns in width. This lamellate was used as a diffraction grating in the following manner:

A light source illuminated a razor thin slit. The slit was imaged on a white screen with a small lens ($f$=50 cm.) and the eutectic cell, mounted on a rigid board was inserted in the light path between the lens and the viewing screen. With the cell to screen distance 50 cm., the first order yellow line was observed 1.75 cm. from the main maximum. Using .56$\mu$ as the wavelength of yellow light, the grating equation $\lambda/d=\sin\theta$, gives the grating spacing as 16$\mu$, in good agreement with the directly measured value.

The invention is described in terms of a limited number of embodiments, but essentially teaches the controlled freezing of organic eutectic and near-eutectic liquid compositions in order to obtain transparent solids having highly regular lamellar microstructures. Accordingly, other organic eutectic compositions may be found which will freeze in the manner of the invention, and other uses will become apparent to those skilled in the art.

What is claimed is:

1. A transparent body consisting essentially of two organic compounds in proportion approximating the eutectic composition, said body having a lamellar microstructure comprising substantially parallel lamellae.

2. The body of claim 1 in which the said two organic compounds are selected from the group consisting of carbon tetrabromide-hexachloroethane, camphor-succinonitrile, and carbon tetrabromide-succinonitrile.

3. The body of claim 2 with said compounds within ±5 weight percent of the amount of each compound required for the said eutectic composition.

4. The body of claim 1 in which the lamellar microstructure consists essentially of alternate lamellae of substantially the same composition and width.

5. The body of claim 1 in which the lamellae microstructure consists essentially of alternate lamellae of substantially the same composition, and in which there is a gradation in the width of the lamellae of at least one composition.

6. The transparent body of claim 1 wherein the parallel lamellae define a diffraction grating.

7. A method of making a transparent body consisting essentially of two organic compounds in proportion approximating the eutectic composition, said body having a lamellar microstructure comprising substantially parallel lamellae, comprising the solidification of said organic components into a thin film of thickness of from 1 to 10 microns, at a growth rate of from 0.002 to 2 mm. per minute, within a temperature gradient of from 100 to 800° C./cm. with a maximum impurity level of 1 part in 1000 based on total weight.

8. A transparent solid body having a lamellar microstructure comprising substantially parallel lamellae and produced by the controlled freezing of a composition of two organic liquids in proportion approximating the eutectic composition.

References Cited

UNITED STATES PATENTS 3,402,979 9/1968 Pao et al. -------- 350—162 X

OTHER REFERENCES

Hunt et al.: "Temperature Gradient Microscope Stage Suitable for Freezing Materials with Melting Points between −100 and +200° C.," The Review of Scientific Instruments vol. 37, No. 6, June 1966, p. 805. Q 184.R5. Copy in Scientific Library.

JOHN K. CORBIN, Primary Examiner

U.S. Cl. X.R.

350—147